United States Patent Office 3,083,872
Patented Apr. 2, 1963

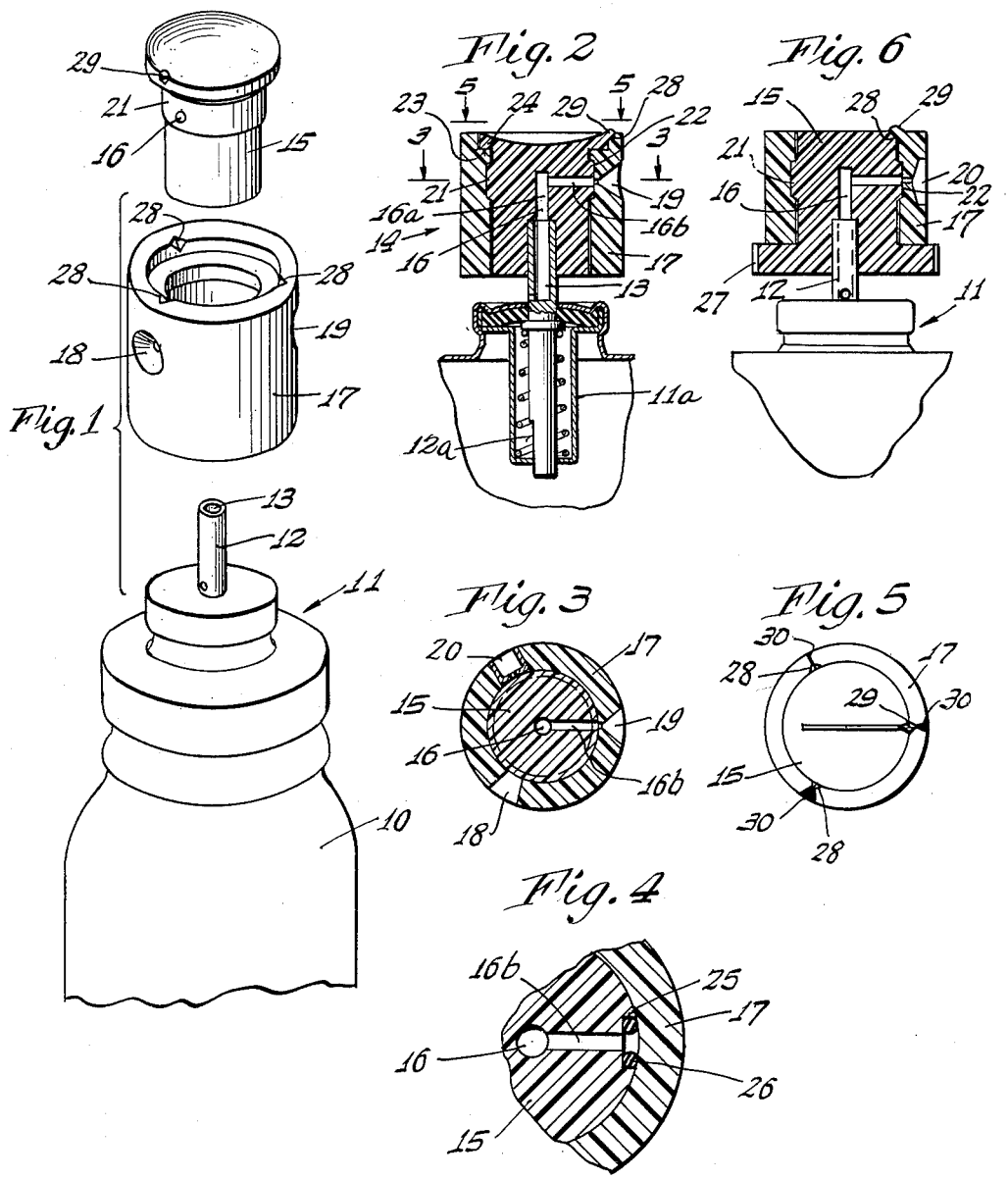

3,083,872
SELECTIVE DISPENSING NOZZLE
Philip Meshberg, 290 Euclid Ave., Fairfield, Conn.
Filed Jan. 2, 1959, Ser. No. 784,611
7 Claims. (Cl. 222—42)

This invention relates to dispensing packages for materials under pressure of miscible or immiscible gases and has particular reference to a dispensing nozzle or operating member for use with such packages. More specifically, it pertains to a selective device for connection to the stem portion of a dispensing valve which is adapted to facilitate dispensing the material from a container under selectively controlled conditions.

Heretofore, dispensing nozzles, which are adapted to be mounted on the movable stem portion of a valve structure, have been formed with a single dispensing orifice of predetermined size and shape for dispensing the material emanating from the container in a predetermined path or pattern. For most purposes, this type of dispensing nozzle or operating member is adequate, and often necessary. However, in many instances it would be desirable to be able to select a specific pattern or path for a specific use without having to resort to substituting nozzles or utilizing a different dispensing package.

The instant invention provides a selectively controlled dispensing nozzle for materials under pressure and has as an important object thereof, the provision of a manually operated nozzle which is adapted to be fixedly mounted on the depressible stem portion of a valve structure for selectively dispensing the material, emanating therethrough, from the container.

It is also an object of the invention to provide a dispensing nozzle having a plurality of dispensing openings therein adapted to be selectively aligned with the dispensing passage in the valve stem whereby the path or pattern of the material being dispensed is controlled.

Another object of the invention is to provide a dispensing nozzle, having a plurality of openings therein adapted to be aligned with the passage in the valve stem, which is leakproof yet adapted to be selectively adjusted with a minimum of difficulty.

Still another object of the invention is to provide in a package for dispensing materials under pressure a dispensing nozzle which includes a mounting portion fixedly carried by the valve stem and having a passage communicating with the passage in the stem and a dispensing portion having a plurality of openings therein movably mounted by the mounting portion for selectively aligning the openings with the passage whereby material in the container is controllably dispensed.

A further object of the invention is to provide a dispensing nozzle, having a plurality of selectively utilized dispensing openings therein, which includes means for indicating the operating position of the openings.

A still further object of the invention is to provide a selectively controlled dispensing nozzle, adapted for use with substantially all valves having a movable dispensing stem portion, which is readily operated by untrained persons, may be manufactured by quantity production methods and is of such rugged character it will function over long periods of time with freedom from all difficulties.

Other objects and advantages of the invention will be apparent from the specification and claims when considered in connection with the attached sheet of drawings, illustrating one form of the invention, wherein like characters represent like parts and in which:

FIGURE 1 is a fragmentary exploded perspective view illustrating one embodiment of the invention;

FIG. 2 is a fragmentary elevational view, taken in section, of the embodiment of the invention shown in FIG. 1;

FIG. 3 is a cross-section view taken in the direction of the arrows 3—3 in FIG. 2;

FIG. 4 is an enlarged fragmentary cross-section view showing an alternative dispensing nozzle structure to that shown in FIGS. 1–3;

FIG. 5 is a plan view taken in the direction of the arrows 5—5 in FIG. 2; and

FIG. 6 is a fragmentary view, partially in section, of an alternative embodiment of the invention.

Referring now to the drawings for a more detailed description of the invention, in FIG. 1 a dispensing package for materials under pressure is shown which includes a container 10 having a material under pressure therein. The container, which may be formed of stainless steel, aluminum, plastic or any other material known to the dispensing package art, sealingly mounts in the open end thereof a valve means 11 for dispensing material from the container on the operation thereof. The valve means includes a projecting valve stem 12 which is longitudinally movable relative to the container 10 for operating the valve and is formed with a passage 13 for passing the material being dispensed from the container.

In normal practice a dispensing button or like operating member, having a single dispensing orifice therein, is fixedly mounted on the valve stem for movement therewith to direct the flow of the material emanating through passage 13. While this manner of controlling the material being dispensed from the package is highly desirable for many purposes, it does not permit the ready adjustment of the flow path and pattern of the material being dispensed.

In order to enable an operator to selectively choose a particular path or flow pattern for the material being dispensed, the instant invention provides a dispensing nozzle, generally indicated by the numeral 14, of plastic or similar material which is mounted by movable valve stem 12, of valve means 11, and is adapted to be manually operated to selectively control the material to be dispensed. According to the invention, as best shown in FIGS. 1 to 3, the selective dispensing nozzle 14 includes a mounting member 15 adapted to be press fit or similarly fixedly mounted on the valve stem for movement therewith. The mounting member is formed with a passage 16 which, when the member is in mounted position, is in open communication with passage 13 in the valve stem. While passage 16 of the mounting member may be of any desirable form or configuration, in the illustrated embodiment of the invention it is shown as including a longitudinally extending bore 16a having a closed end and a laterally extending passage 16b communicating therewith. Outwardly of mounting member 15 and rotatably carried thereby is a dispensing member or sleeve 17 having a plurality of dispensing openings 18, 19 and 20 therein, which are adapted to be selectively aligned with passage 16 of the mounting member to control the flow of material emanating through the valve stem from the container. While three dispensing orifices are shown in the illustrated embodiment of the invention, it will be understood that any desirable number may be utilized.

In order to prevent the leakage of the material, which is being dispensed under pressure, from between mounting member 15 and sleeve 17, the instant invention provides a leakproof connection between the two which will retain the material in its proper channel and yet will not interfere with the relative movement between the parts. According to the invention, an annular ridge 21 is formed around the periphery of mounting member 15 to overlie passage 16. The ridge is adapted to be sealingly yet movably seated within an annular groove 22 formed within sleeve 17 and underlying the openings 18, 19 and 20 thereof. It will be readily understood by those versed in the dispensing art, that the mating engagement of ridge 21 with groove 22 will prevent the leakage or seepage of material as it is being dispensed and that the relatively small surface area of the mounting member and dispensing sleeve which are in sealing engagement will not interfere with relative movement of the parts.

Directing our attention now particularly to FIG. 2, it will be observed that dispensing sleeve 17 is formed with an inwardly extending shoulder 23 which is adpted to seat a flange 24 formed on the mounting member to prevent the outward movement of the sleeve relative to the mounting member. In assembling the parts of dispensing nozzle 14, the mounting member is pressed downwardly into the sleeve, as best seen in FIG. 1, until it is locked in engagement therewith by the mating of ridge 21 with groove 22 and the seating of flange 24 on shoulder 23. Thereafter the nozzle is mounted on valve stem 12 by press fitting it on the same or in any other manner known to the art.

In the form of the invention shown in FIG. 2, rotation of valve stem 12 relative to valve housing 11a, when dispensing member 17 is moved relative to mounting member 15, is prevented by cooperation between the flat surface 12a of the stem and a complementary portion of the valve housing. As will be hereinafter discussed, variations in the nozzle structure may be resorted to, to facilitate the use of the nozzle with valve means 11 when the valve stem is rotatable relative to the valve housing.

In FIG. 4 an alternative form of leakage seal between the mounting member and dispensing sleeve is shown. In this form of the invention mounting member 15 is formed with a counterbore to overlie passage 16, as at 25, to sealingly receive an O-ring 26 or simlar gasket. It will be observed that when the parts of dispensing nozzle 14 are assembled, with O-ring 26 in position in counterbore 25, that a portion of the surface of the O-ring engages the inner surface of dispensing sleeve 17 whereby the O-ring is compressed to form a fluid tight seal.

Referring now to FIG. 6, an alternative form of dispensing nozzle 14 is shown, which is adapted for use with valve means 11 in which the valve stem 12 is rotatable. In this form of the invention mounting member 15 is provided with a knurled flange or rim 27 at its bottom end. According to this form of the invention, when it is desired to rotate the dispensing sleeve relative to the mounting member to selectively align one of the openings with the passage 16 therein, the operator grips knurled rim 27 to prevent rotation of the mounting member and the valve stem as the sleeve is turned.

In order to facilitate the proper alignment of the various openings 18, 19 and 20 in dispensing member 17 with the passage 16 of the mounting member, indicating means may be provided. While various means may be resorted to, to facilitate alignment of the openings, in the illustrated embodiment of the invention it is contemplated that one of the members, either the mounting member or the dispensing sleeve, be formed with a plurality of notches 28, corresponding in number to the number of dispensing openings formed in dispensing member 17, which are adapted to removably receive a tongue or finger 29 formed on the other member. It will be understood that when the dispensing member is rotated relative to the mounting member that the tongue 29 will seat itself in one of the notches 28 when one of the orifices 18, 19 or 20 is aligned with passage 16 of the mounting member. In the embodiment of the invention of FIG. 2, notches 28 are shown formed in the dispensing member with tongue 29 formed integral with flange 24 of the mounting member to facilitate the assembling of the parts. In FIG. 6 the notches and tongue are reversed, with the latter being formed integral with the sleeve and the former being formed in the mounting member. This reversal of the parts is resorted to, to facilitate the ready assembly of the nozzle whch, in this case, requires that sleeve 17 be pressed downwardly over mounting member 15 until the bottom of the sleeve engages the upper surface of rim 27.

In view of the fact that the dispensing orifices or openings may be very small and are of different configuration, it is contemplated that visual indicating means may be provided on the upper surface of the dispensing nozzle, in cooperation with the notches and tongue to provide a visible indication to the operator, of the shape or configuration of a particular orifice. In FIG. 5 symbols 30, corresponding in shape to the configuration of the orifices, are marked or similarly formed on dispensing sleeve 17 adjacent the notches 28 to indicate the shape and size, etc., of the various orifices 18, 19 and 20.

Thus, among others, the several objects of the invention as aforenoted are achieved. Obviously numerous changes in the structure may be resorted to without departing from the spirit of the invention as defined by the claims.

I claim:

1. A dispensing package for material under pressure comprising a container having a material under pressure therein, valve means mounted on said container for dispensing said material on the operation thereof, said valve means including a projecting stem portion movable relative to said container for operating said valve, said stem portion having a passage therein for passing said material, a cylindrical body member having a passage therein communicating with said passage in said stem mounted solely on said stem portion for movement therewith, said body member including a circumferential ridge overlying said passage therein and of greater diameter than said body member, a dispensing sleeve member rotatably mounted by said body member and having a circumferential groove adapted to sealingly receive said ridge, said dispensing sleeve having a plurality of openings spaced around said groove adapted to be selectively aligned with said passage in said body member for regulating the flow of material dispensed from said container and means for indicating passage aligned position of said sleeve relative to said body member.

2. A dispensing package for material under pressure comprising a container having a material under pressure therein, valve means mounted on said container for dispensing said material on the operation thereof, said valve means including a projecting stem portion movable relative to said container for operating said valve, said stem portion having a passage therein for passing said material, a cylindrical body member mounted solely on said stem portion for movement therewith and having a passage therein communicating with said passage in said stem, said body member being counter-sunk at the opening of said passage therein and having an O-ring seated in said counter-sink to surround said passage and extend outwardly of the outer surface of said body member, a dispensing sleeve member rotatably mounted solely by said body member and sealingly engaged by said O-ring, said dispensing sleeve having a plurality of openings therein adapted to be selectively aligned with said passage in said body member for regulating the flow of material dispensed from said container and means for indicating passage aligned position of said sleeve relative to said body member.

3. A dispensing package for material under pressure comprising a container having a material under pressure therein, valve means mounted on said container for dispensing said material on the operation thereof, said valve means including a projecting stem portion movable relative to said container for operating said valve, said stem portion having a passage therein for passing said material, and a dispensing nozzle mounted solely on said stem portion for movement therewith and being free of contact with the container in all positions of movement, said dispensing nozzle having a two-part construction, one of said parts being fixed to said stem and having a passage communicating with the passage in the stem, and the other of said parts having means interlocked with said first part to prevent relative axial movement with respect thereto and for permitting relative rotation with respect thereto and having a plurality of openings therein adapted to selectively align with said passages for regulating flow of material dispensed from the container.

4. The invention as defined in claim 3 wherein said openings are provided with means for forming different spray patterns.

5. The invention as defined in claim 3 wherein there is provided means for preventing rotation of said valve and nozzle part fixed thereto when the other of said nozzle parts is rotated to selectively align the openings and the passage.

6. The invention as defined in claim 3 wherein there is a sealing means between the two parts of the dispensing nozzle to seal the juncture of the passage in the one part with the selected aligned opening whereby undesired leakage between said parts is prevented.

7. The invention as defined in claim 3 wherein one of said parts of the dispensing nozzle is provided with a plurality of notches corresponding to the number of openings and the other of said parts of the dispensing nozzle is provided with a projecting tongue to cooperate with said notches to indicate the selected opening which is aligned with said passage.

References Cited in the file of this patent

UNITED STATES PATENTS

| | | |
|---|---|---|
| 584,892 | Record | June 22, 1897 |
| 650,617 | Salomon | May 29, 1900 |
| 727,612 | Glanville | May 12, 1903 |
| 1,417,031 | Casoro et al. | May 23, 1922 |
| 1,554,521 | Reece | Sept. 22, 1925 |
| 1,640,528 | Bruhn | Aug. 30, 1927 |
| 2,623,785 | Henchert | Dec. 30, 1952 |
| 2,721,010 | Meshberg | Oct. 18, 1955 |
| 2,770,402 | Quam | Nov. 13, 1956 |
| 2,797,965 | McKernan | July 2, 1957 |
| 2,887,273 | Anderson et al. | May 19, 1959 |
| 2,997,243 | Kolb | Aug. 22, 1961 |

FOREIGN PATENTS

| | | |
|---|---|---|
| 520,078 | Belgium | June 15, 1953 |